(12) United States Patent
Lin et al.

(10) Patent No.: US 6,820,491 B2
(45) Date of Patent: Nov. 23, 2004

(54) PRESSURE DIFFERENTIAL MEASURING TOOL

(75) Inventors: Jain-Fa Lin, Yung Kang (TW); Shih-Chang Shih, Tainan (TW)

(73) Assignee: Taiwan Semiconductor Manufacturing Co., Ltd., Hsin Chu (TW)

( * ) Notice: Subject to any disclaimer, the term of this patent is extended or adjusted under 35 U.S.C. 154(b) by 0 days.

(21) Appl. No.: 10/264,537

(22) Filed: Oct. 5, 2002

(65) Prior Publication Data

US 2004/0065153 A1 Apr. 8, 2004

(51) Int. Cl.[7] .............................................. G01L 7/10
(52) U.S. Cl. ........................................................ 73/730
(58) Field of Search .......................... 73/700, 716, 736

(56) References Cited

U.S. PATENT DOCUMENTS 5,520,054 A * 5/1996 Romo ......................... 73/715
5,756,892 A * 5/1998 Porro et al. .................. 73/147
5,945,591 A * 8/1999 Saarem ....................... 73/1.35
6,484,586 B1 * 11/2002 Dutoit et al. ................ 73/722

* cited by examiner

Primary Examiner—Edward Lefkowitz
Assistant Examiner—Andre Allen
(74) Attorney, Agent, or Firm—Tung & Associates

(57) ABSTRACT

A pressure differential measuring tool which includes a wafer container having a pressure difference meter provided in fluid communication therewith. In use, the wafer container is placed in the indexer of the process tool, which is operated according to normal operational parameters. The pressure difference meter measures the difference in pressure between the air in the indexer, which equalizes with pressure in the wafer container, and the ambient or atmospheric air surrounding the chamber, which equalizes with the pressure of the air in the process chamber. The air pressure in the indexer can then be adjusted to a value higher than the ambient or atmospheric air pressure to prevent influx of air and particles from the process chamber into the indexer and wafer container.

16 Claims, 1 Drawing Sheet

PRESSURE DIFFERENTIAL MEASURING TOOL

FIELD OF THE INVENTION

The present invention relates to process tools for the fabrication of integrated circuits on semiconductor wafer substrates. More particularly, the present invention relates to a tool for measuring the pressure difference between atmospheric or ambient air in a semiconductor fabrication facility and an indexer in a process tool to prevent influx of potential wafer-contaminating particles into the indexer.

BACKGROUND OF THE INVENTION

Generally, the process for manufacturing integrated circuits on a silicon wafer substrate typically involves deposition of a thin dielectric or conductive film on the wafer using oxidation or any of a variety of chemical vapor deposition processes; formation of a circuit pattern on a layer of photoresist material by photolithography; placing a photoresist mask layer corresponding to the circuit pattern on the wafer; etching of the circuit pattern in the conductive layer on the wafer; and stripping of the photoresist mask layer from the wafer. Each of these steps, particularly the photoresist stripping step, provides abundant opportunity for organic, metal and other potential circuit-contaminating particles to accumulate on the wafer surface.

In the semiconductor fabrication industry, minimization of particle contamination on semiconductor wafers increases in importance as the integrated circuit devices on the wafers decrease in size. With the reduced size of the devices, a contaminant having a particular size occupies a relatively larger percentage of the available space for circuit elements on the wafer as compared to wafers containing the larger devices of the past. Moreover, the presence of particles in the integrated circuits compromises the functional integrity of the devices in the finished electronic product. When the circuits on a wafer are submicron in size, the smallest quantity of contaminants can significantly reduce the yield of the wafers. For instance, the presence of particles during deposition or etching of thin films can cause voids, dislocations, or short-circuits which adversely affect performance and reliability of the devices constructed with the circuits. Accordingly, technological advances in recent years in the increasing miniaturization of semiconductor circuits necessitate correspondingly stringent control of impurities and contaminants in the plasma process chamber. Currently, mini-environment based IC manufacturing facilities are equipped to control airborne particles much smaller than 1.0 $\mu$m, as surface contamination continues to be of high priority to semiconductor manufacturers. To achieve an ultra-clean wafer surface, particles must be removed from the wafer. Particle-removing and contamination-preventing methods are therefore of utmost importance in the fabrication of semiconductors.

During the photolithography step of semiconductor production, light energy is applied through a reticle mask onto a photoresist material previously deposited on the wafer to define circuit patterns which will be etched in a subsequent processing step to define the circuits on the wafer. Because these circuit patterns on the photoresist represent a two-dimensional configuration of the circuit to be fabricated on the wafer, minimization of particle generation and uniform application of the photoresist material to the wafer are very important. By minimizing or eliminating particle generation during photoresist application, the resolution of the circuit patterns, as well as circuit pattern density, is increased.

Photoresist materials are coated onto the surface of a wafer by dispensing a photoresist fluid typically on the center of the wafer as the wafer rotates at high speeds within a stationary bowl or coater cup. The coater cup catches excess fluids and particles ejected from the rotating wafer during application of the photoresist. The photoresist fluid dispensed onto the center of the wafer is spread outwardly toward the edges of the wafer by surface tension generated by the centrifugal force of the rotating wafer. This facilitates uniform application of the liquid photoresist on the entire surface of the wafer.

Spin coating of photoresist on wafers is carried out in an automated track system using wafer handling equipment which transport the wafers between the various photolithography operation stations, such as vapor prime resist spin coat, develop, baking and chilling stations. Robotic handling of the wafers minimizes particle generation and wafer damage. Automated wafer tracks enable various processing operations to be carried out simultaneously. Two types of automated track systems widely used in the industry are the TEL (Tokyo Electron Limited) track and the SVG (Silicon Valley Group) track.

The various processing steps used in the fabrication of devices on a wafer substrate are carried out sequentially in multiple processing systems. An example of such a processing system is an automated track-type semiconductor fabrication apparatus which may be obtained from the Tokyo Electron Co., of Tokyo, Japan, and is generally indicated by reference numeral 1 in the schematic of FIG. 1. The apparatus 1 includes an enclosure 2 and a track 3 which transports semiconductor wafer substrates 12 (FIG. 2) among multiple process stations where the substrates 12 are subjected to various treatments during the fabrication process. The apparatus 1 includes a spin coater station 4, further shown in FIG. 2, and multiple hot/cold plate stations 5, 6, and 7, respectively, arranged in series. The track 3 transports wafer containers 11, each of which contains multiple wafer substrates 12, from upstream process stations (not shown) to the spin coater station 4, in which a coating layer of photoresist material, for example, is applied to the surface of the substrates 12. Next, the track 3 transports the wafer containers 11 and coated wafer substrates 12 into and out of the hot/cold plate stations 5, 6, 7 for conversion of the spin-coated material coated on the substrates 12 into a low dielectric constant material, according to the knowledge of those skilled in the art.

In typical operation of the apparatus 1, the wafer container 11, which may be a SMIF (standard mechanical interface) pod, for example, contains the multiple wafer substrates 12 and is loaded into an indexer 10 of the spin coater station 4. Each of the wafer substrates 12 is individually transferred from the wafer container 11 and placed on a wafer support 15 in a process chamber 14. During the photoresist coating process, the wafer support 15 is rotated at high speeds as the liquid photoresist (not shown) is dispensed onto the substrate 12 through a dispensing opening (not shown) in the top of the process chamber 14. The photoresist is uniformly distributed on the surface of the rotating substrate 12, after which the coated substrate 12 is transferred back into the wafer container 11. After all of the substrates 12 in the wafer container 11 have undergone the coating process, the wafer container 11, containing the coated substrates 12, is removed from the indexer 10, and the track 3 distributes the wafer container 11 to the next station in the apparatus 1.

During the photoresist application process in the process chamber 14, the high rotational speed of the wafer support 15 generates photoresist powder particles in the process chamber 14. While most of these particles are removed by operation of a vacuum exhaust line (not shown), a small quantity of the particles remain in the process chamber 14. Due to the top dispensing opening (not shown) provided in the top of the process chamber 14, the pressure of air inside the process chamber 14 equalizes with the pressure of ambient or atmospheric air surrounding the process chamber 14. Thus, in the event that the pressure of the air or gas in the indexer 10 is lower than the atmospheric pressure of the air or gas in the process chamber 14, the particles tend to flow with the turbulent gas or air from the higher-pressure process chamber 14 into the lower-pressure indexer 10, as indicated by the arrows in FIG. 2. Consequently, the photoresist particles settle on the substrates 12 in the wafer holder 11 and impart ball-type defects to the devices on the substrate 12, which defects reduce the yield of devices on the substrates 12 and necessitate scrapping of the affected substrates 12. Accordingly, it is very important to monitor the pressure of air or gas in the indexer 10 and maintain this interior pressure at a higher level than the pressure in the process chamber 14, in order to prevent turbulent flow of air or gas from the process chamber 14 into the indexer 10 and attendant contamination of substrates 12 in the wafer holder 11 during transfer of a substrate 12 into the process chamber 14.

An object of the present invention is to provide a device for measuring the pressure of air or gas in an indexer of a process tool for semiconductors.

Another object of the present invention is to provide a device for comparing the pressure of air or gas in an indexer of a process tool to ambient or atmospheric air or gas.

Still another object of the present invention is to provide a device for reducing or preventing contamination of devices on a WIP (work in progress) wafer substrate.

Yet another object of the present invention is to provide a device for preventing unnecessary scrapping of semiconductor wafer substrates due to powder contamination of the substrates.

A still further object of the present invention is to provide a device which is suitable for comparing atmospheric or ambient air pressure with the interior pressure of an indexer in a variety of processing tools for semiconductors.

Yet another object of the present invention is to provide a device which is capable of comparing atmospheric pressure of air inside a spin coating chamber with pressure of gas or air inside an indexer for indexing and loading substrates into the chamber.

SUMMARY OF THE INVENTION

In accordance with these and other objects and advantages, the present invention is generally directed to a device for measuring or comparing the difference between the pressure of air or gas in an indexer for a process tool with the pressure of atmospheric or ambient air surrounding the process tool, in order to prevent flow of air and potential device-contaminating particles from the process tool chamber into the indexer. The device of the present invention comprises a wafer container having a pressure difference meter provided in fluid communication therewith. In use, the wafer container is placed in the indexer of the process tool, which is operated according to normal operational parameters. The pressure difference meter measures the difference in pressure between the air in the indexer, which equalizes with pressure in the wafer container, and the ambient or atmospheric air surrounding the chamber, which equalizes with the pressure of the air in the process chamber. The air pressure in the indexer can then be adjusted to a value higher than the ambient or atmospheric air pressure to prevent influx of air and particles from the process chamber into the indexer and wafer container.

BRIEF DESCRIPTION OF THE DRAWINGS

The invention will now be described, by way of example, with reference to the accompanying drawings, in which.

DESCRIPTION OF THE PREFERRED EMBODIMENTS

The present invention has particularly beneficial utility in measuring the difference in air pressures between atmospheric or ambient air and air inside an indexer of a spin coating apparatus for semiconductor wafer substrates. However, the invention is not so limited in application, and while references may be made to such indexer and spin coating apparatus, the invention is more generally applicable to measuring pressure differentials in a variety of industrial and mechanical applications.

Figure 1:
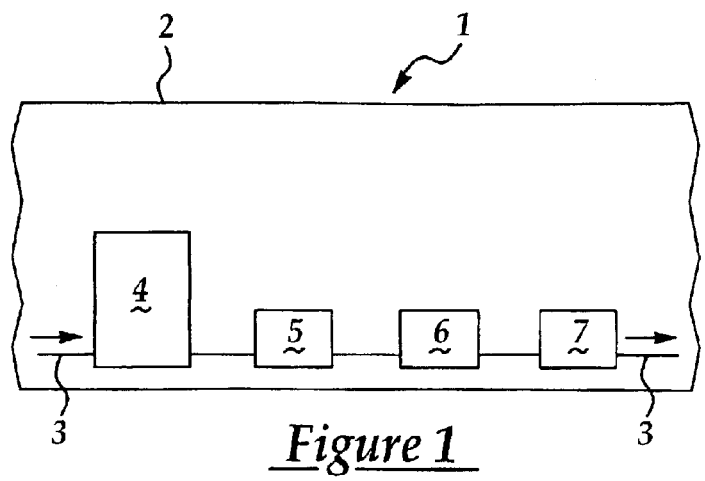
FIG. 1 is a schematic view of a typical conventional track-type apparatus for the processing of semiconductor wafer substrates.
Figure 2:
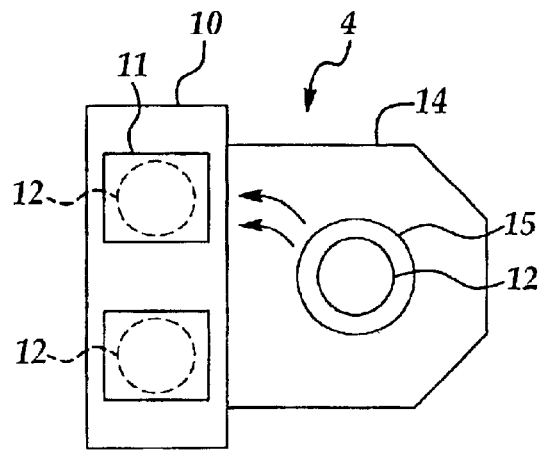
FIG. 2 is a top schematic view of a typical conventional spin coater station suitable for implementation of the present invention.
Figure 3:
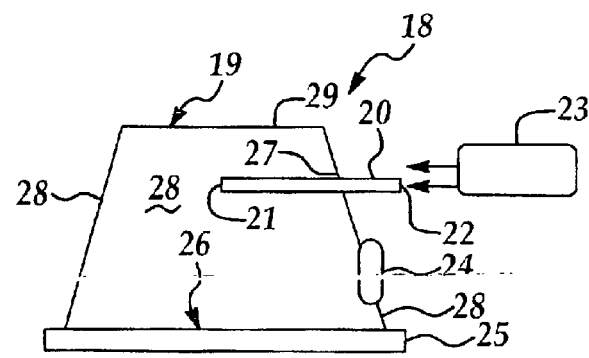
FIG. 3 is a side schematic view of a pressure differential measuring tool of the present invention.

Referring to FIG. 3, an illustrative embodiment of a pressure differential measuring tool of the present invention is generally indicated by reference numeral 18. The tool 18 includes an enclosure 19, which may be a wafer container such as a SMIF (standard mechanical interface) pod or any other type of container suitable for transporting semiconductor wafer substrates (not shown) among various processing tools in a semiconductor fabrication facility. In that case, the enclosure 19 may include a removable door 25 which normally closes an opening 26 through which wafer substrates (not shown) are placed in and removed from the enclosure 19 when the door 25 is removed. The enclosure 19 may include side panels 28 which extend from a top panel 29 and define the opening 26, as shown in FIG. 3. However, it is understood that the enclosure 19 may have any alternative design conducive to the purposes of the present invention. An identification tag 24 may be provided on the enclosure 19 for identifying wafer substrates contained therein.

A pressure tube 20 extends through a tube opening 27 provided typically in one of the side panels 28 of the enclosure 19. Glue (not shown) is typically provided between the pressure tube 20 and the edges of the tube opening 27 to provide an airtight seal between the pressure tube 20 and the enclosure 19 at the tube opening 27. Alternatively, the pressure tube 20 may be molded integrally with the enclosure 19. The pressure tube 20 may include an interior end 21 which extends into the interior of the enclosure 19 and an exterior end 22 which is located outside the enclosure 19, as shown. Alternatively, the interior end 21 of the pressure tube 20 may be molded integrally with the enclosure 19 and terminate at the tube opening 27. A pressure gauge 23, which may be conventional, is connected in fluid communication with the exterior end 22 of the pressure tube 20. In a preferred embodiment the pressure gauge 23 is removably coupled to the pressure tube 20, although the pressure gauge 23 may alternatively be fixedly attached to the pressure tube 20. Typically, the pressure gauge 23 is a conventional pressure differential meter which is capable of simultaneously measuring the pressure of air in the pressure tube 20 and the pressure of ambient or atmospheric air surrounding the pressure meter 23 outside the enclosure 19, and displaying or otherwise indicating these values and/or calculating and displaying or otherwise indicating the air pressure difference between these values. However, the pressure gauge 23 may alternatively be any type of gauge which is capable of measuring and displaying or otherwise indicating the pressure of air inside the pressure tube 20.

Figure 4:
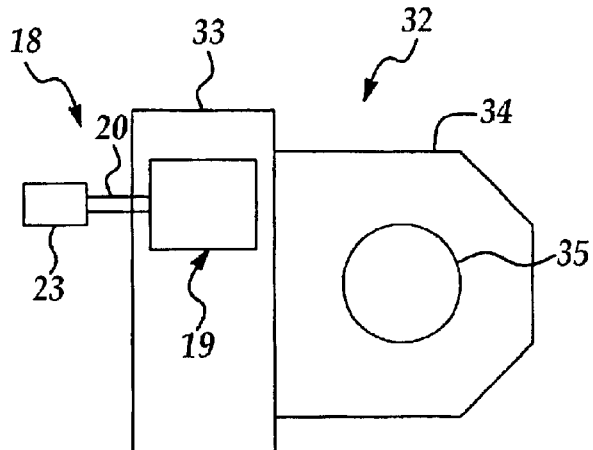
FIG. 4 is a top schematic view of a typical conventional spin coater station in implementation of the present invention.

Referring next to FIG. 4, in typical application the pressure tool 18 is used to measure and indicate the differential in pressures between external ambient air surrounding a spin coater station 32 and internal air inside an indexer 33 of the spin coater station 32. The spin coater station 32 may be conventional and typically includes a process chamber 34 which communicates with the indexer 33 and houses a wafer support 35 that supports a wafer substrate (not shown) for processing, in conventional fashion. A dispensing opening (not shown) is typically provided in the top of the process chamber 34, through which dispensing opening liquid photoresist is dispensed onto the wafer substrate as the wafer substrate is rotated on the wafer support 35. Because the dispensing opening establishes air communication between the exterior of the process chamber 34 and the interior of the process chamber 34, the pressure of air inside the process chamber 34 is the same as the pressure of ambient air surrounding the process chamber 34.

According to the invention, the enclosure 19, devoid of wafer substrates, is placed inside the indexer 33 in the same manner as a wafer container such as a SMIF pod is placed in the indexer 33 for removal and processing of substrates contained therein, in conventional fashion. With the pressure tube 20 extending from the enclosure 19, the spin coater station 32 is operated according to operational parameters which would be implemented in the event of actual semiconductor processing, such as during a photoresist coating operation, to simulate a typical running status of the spin coater station 32. Accordingly, with the door 25 removed from the enclosure 19 to expose the opening 26, pressure of air in both the enclosure 19 and the pressure tube 20 equalizes with pressure of air in the indexer 33. The pressure gauge 23 is connected to the exterior end 22 of the pressure tube 20, at which time the pressure gauge 23 measures both the pressure of air in the pressure tube 20 and the pressure of ambient air surrounding the pressure gauge 23 outside the spin coater station 32, and thus, the pressure of air inside the process chamber 34. These values may be displayed on the pressure gauge 23, or the pressure gauge 23 may display the difference between these air pressure values. In the event that the pressure of air inside the enclosure 19 and indexer 33 is lower than the pressure of the ambient air, and thus, the air inside the process chamber 34, as measured and indicated by the pressure gauge 23, the operational parameters of the spin coater station 32 may be adjusted as needed, according to the knowledge of those skilled in the art, to achieve an internal indexer air pressure which is greater than the external ambient air pressure, and thus, the air pressure inside the process chamber 34, before unloading and processing of wafer substrates is begun. Accordingly, the pressure of the air inside the indexer 33 must always be positive with respect to the air pressure in the process chamber 34 in order to prevent flow of air from the interior of the process chamber 34 into the indexer 33 and thus, influx of potential device-contaminating particles with the air from the process chamber 34 into the indexer 33. Preferably, the difference in air pressures between the indexer 33 and the process chamber 34 is as small as possible, typically about 1 pascal (Pa).

While the preferred embodiments of the invention have been described above, it will be recognized and understood that various modifications can be made in the invention and the appended claims are intended to cover all such modifications which may fall within the spirit and scope of the invention.

What is claimed is:

1. A pressure tool comprising:

an enclosure having a removable door; and a pressure gauge provided in fluid communication with said enclosure for measuring an internal air pressure inside said enclosure, wherein said pressure gauge comprises a pressure differential meter for measuring an external air pressure outside said pressure differential meter and said internal air pressure inside said enclosure and indicating a difference value between said external air pressure and said internal air pressure.

2. A pressure tool comprising:

an enclosure;

a pressure gauge provided in fluid communication with said enclosure for measuring an internal air pressure inside said enclosure; and wherein said enclosure comprises a semiconductor wafer container said pressure gauge comprising a pressure differential meter for measuring an external air pressure outside said differential meter and said internal air pressure inside said enclosure and indicating a difference value between said external air pressure and internal air pressure.

3. The pressure tool of claim 1 further comprising a pressure tube extending between said pressure gauge and said enclosure and wherein said pressure gauge is provided in fluid communication with said enclosure through said pressure tube.

4. The pressure tool of claim 3 wherein said pressure gauge comprises a pressure differential meter for measuring an external air pressure outside said pressure differential meter and said internal air pressure inside said enclosure and indicating a difference value between said external air pressure and said internal air pressure.

5. A pressure tool comprising:

an enclosure;

a pressure gauge provided in fluid communication with said enclosure for measuring an internal air pressure inside said enclosure, wherein said pressure gauge comprises a pressure differential meter for measuring an external air pressure outside said pressure differential meter and said internal air pressure inside said enclosure and indicating a difference value between said external air pressure and said internal air pressure;

a pressure tube extending between said pressure gauge and said enclosure and wherein said pressure gauge is provided in fluid communication with said enclosure through said pressure tube; and wherein said enclosure comprises a semiconductor wafer container.

6. The pressure tool of claim 2 wherein said semiconductor wafer container comprises a SMIF pod.

7. The pressure tool of claim 6 wherein said pressure gauge comprises a pressure differential meter for measuring an external air pressure outside said pressure differential meter and said internal air pressure inside said enclosure and indicating a difference value between said external air pressure and said internal air pressure.

8. The pressure tool of claim 6 further comprising a pressure tube extending between said pressure gauge and said SMIF pod and wherein said pressure gauge is provided in fluid communication with said SMIF pod through said pressure tube.

9. The pressure tool of claim 8 wherein said pressure gauge comprises a pressure differential meter for measuring an external air pressure outside said pressure differential meter and said internal air pressure inside said enclosure and indicating a difference value between said external air pressure and said internal air pressure.

10. A pressure tool comprising:

an enclosure having a removable door;

a pressure tube provided in fluid communication with said enclosure; and a pressure gauge removably coupled to said pressure tube for measuring an internal air pressure inside said enclosure, wherein said pressure gauge comprises a pressure differential meter for measuring an external air pressure outside said pressure differential meter and said internal air pressure inside said enclosure and indicating a difference value between said external air pressure and said internal air pressure.

11. The pressure tool of claim 10 wherein said enclosure comprises a semiconductor wafer container.

12. The pressure tool of claim 11 wherein said semiconductor wafer container comprises a SMIF pod.

13. A method of measuring a difference in air pressures between external ambient air and internal air inside an indexer of a process tool, comprising the steps of:

providing an enclosure;

providing a pressure differential meter in fluid communication with said enclosure;

providing said enclosure in fluid communication with the indexer of the process tool; and operating the process tool, whereby said pressure differential meter simultaneously measures a pressure of the external ambient air and a pressure of the internal air inside the indexer and indicates a difference value between the pressure of the external ambient air and the pressure of the internal air inside the indexer.

14. The method of claim 13 wherein said enclosure comprises a semiconductor wafer container.

15. The method of claim 14 wherein said semiconductor wafer container comprises a SMIF pod.

16. The method of claim 13 wherein said providing a pressure differential meter in fluid communication with said enclosure comprises the steps of providing a pressure tube in fluid communication with said enclosure and providing said pressure differential meter in fluid communication with said pressure tube.

* * * * *